United States Patent

[11] 3,617,631

[72] Inventor Michael Richard Soames
Cambridge, England
[21] Appl. No. 852,972
[22] Filed Aug. 18, 1969
[45] Patented Nov. 2, 1971
[73] Assignee Metals Research Limited
Melbourn, Royston, England
[32] Priority Feb. 6, 1965
[33] Great Britain
[31] 5256
Continuation of application Ser. No. 523,725, Jan. 28, 1966, now abandoned.

[54] IMAGE ANALYSIS SYSTEMS
15 Claims, 12 Drawing Figs.

[52] U.S. Cl. .......... 178/6.8, 307/235, 328/117, 328/135, 328/150
[51] Int. Cl. .......... H04n 7/18, H03k 5/20
[50] Field of Search .......... 328/65, 117, 135, 116, 150, 111; 178/6.8; 307/234, 235, 263; 330/149

[56] References Cited

UNITED STATES PATENTS

| | | | |
|---|---|---|---|
| 3,005,045 | 10/1961 | Shanahan | 178/6.8 |
| 3,361,872 | 1/1968 | Sweeney | 178/6.8 |
| 1,481,284 | 1/1924 | Deardorff | 328/115 |
| 2,760,064 | 8/1956 | Bell | 328/117 |
| 2,779,869 | 1/1957 | Gerks | 328/135 |
| 2,992,293 | 7/1961 | Camerson | 178/6.8 |
| 3,076,145 | 1/1963 | Copeland | 328/135 |
| 3,214,515 | 10/1965 | Eberline | 128/6.8 |

*Primary Examiner*—Robert L. Griffin
*Assistant Examiner*—Joseph A. Orsino, Jr.
*Attorney*—Beveridge & DeGrandi

ABSTRACT: Apparatus for the quantitative analysis of a specific part of a complete picture of specimens such as blood samples, minerals and metallurgical specimens includes means for producing a scanned electrical first video signal of the complete picture, a discriminator for isolating the portion of the first video signal corresponding to a specific part of the complete picture, and means permitting a comparison between the output from the discriminator and the first video signal for accurately setting the level of the discriminator.

Figure 4:
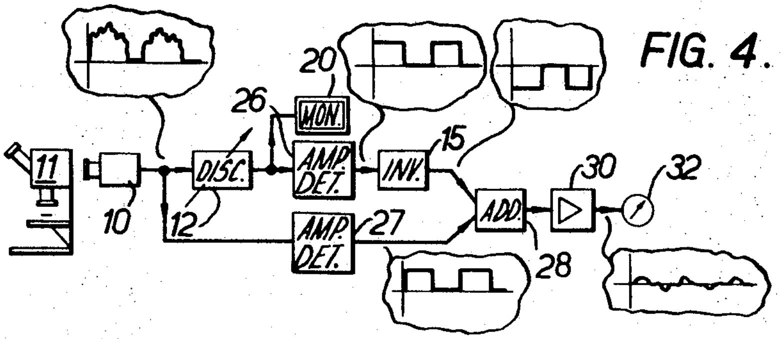

FIG. 1.
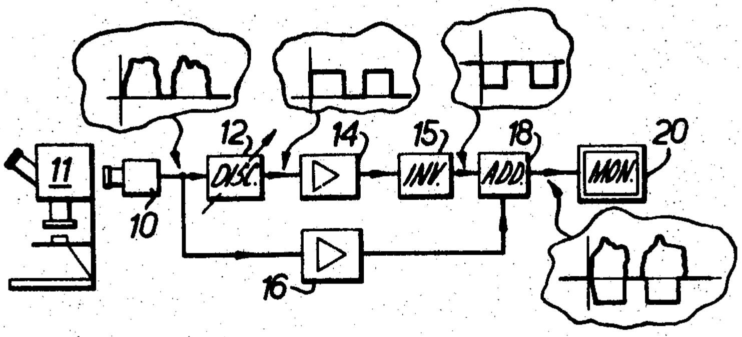
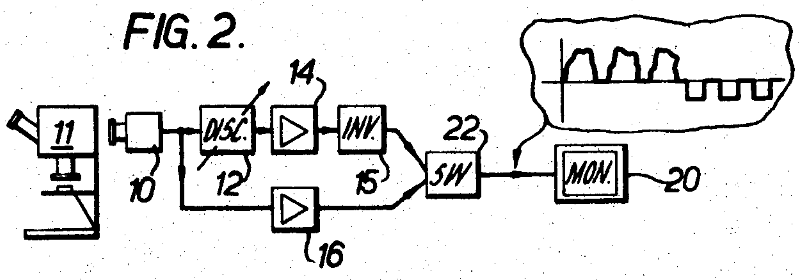
FIG. 3. FIG. 8
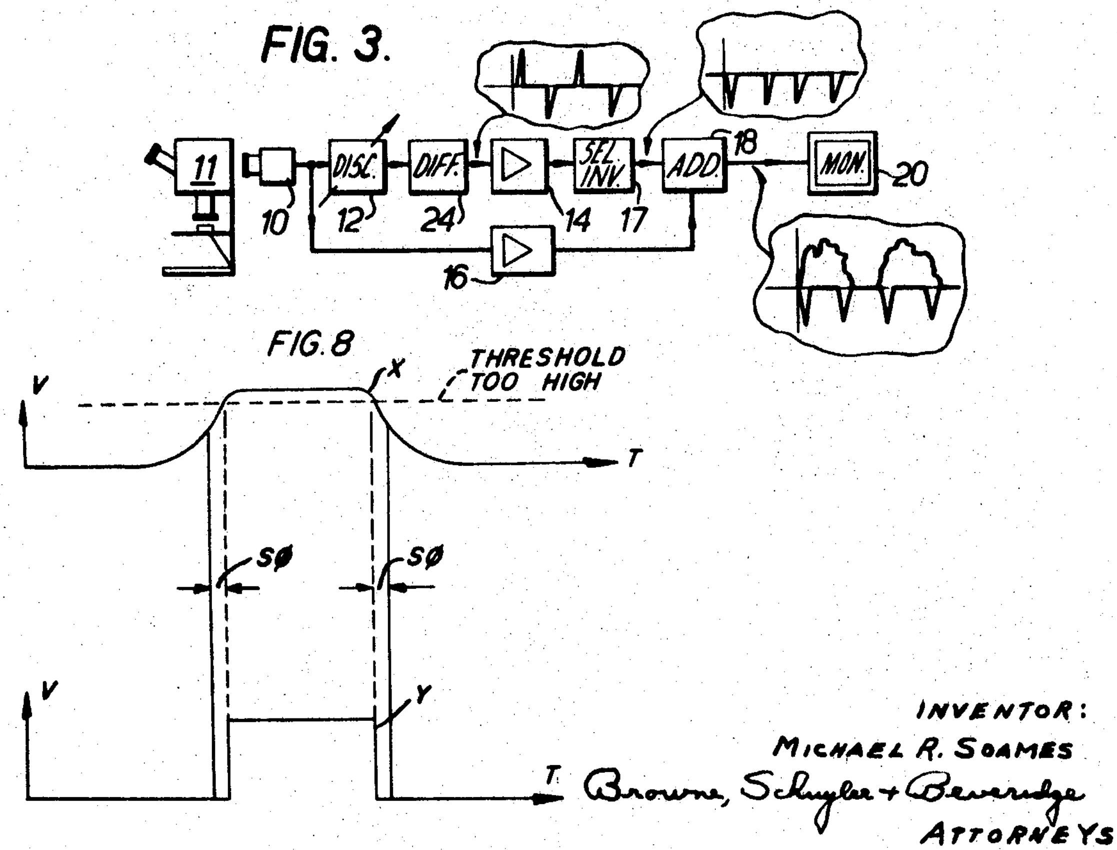
INVENTOR:
MICHAEL R. SOAMES
Browne, Schuyler + Beveridge
ATTORNEYS INVENTOR:
MICHAEL R. SOAMES
Browne, Schuyler + Beveridge
ATTORNEYS INVENTOR:
MICHAEL R. SOAMES
Browne, Schuyler + Beveridge
ATTORNEYS

IMAGE ANALYSIS SYSTEMS

The present invention relates to the analysis and measurement of features contained within the optical images and in particular to the determination of a suitable signal discrimination level whereby the desired features may be selected from the remainder of the image.

When analyzing optical images for the purpose of determining the shape and size of features contained therein, it is convenient to create a second quantised image containing only the required features and with greatly enhanced or infinite contrast and definition. However considerable difficulty is often experienced in the determination of a suitable discrimination level so as to accurately define the feature boundaries of the original image.

One possible method for determining this level involves the visual comparison of two separate images of substantially the same scale, one image containing only the features it is required to examine as described above, and the other containing both wanted and unwanted features. The discrimination level may then be adjusted until the size and shape of the features in both images appear to be the same. The image which contains only the desired features as described above may then be analyzed and measurements made thereon. This method, however, involves the use of two picture reproducers such as conventional picture display monitors and the accuracy is not entirely independent of the human element.

Image analysis has many applications and is used in making blood counts, assessing the sizes of cells in nonmetallic materials, in the petrographic examination of minerals, in particle sizing and in the examinations of fabrics and fiber. However the invention has a particular application in the examination of metallurgical specimens with a reflecting microscope and associated apparatus.

If a metallurgical specimen is polished and etched in a certain manner and viewed under a microscope, it is possible to see and examine the grain structure and nonmetallic inclusion content of the specimen since the grain boundaries and nonmetallic inclusions reflect light differently from the remainder of the surface of the specimen. It is therefore possible to obtain data from measurement of such specimens, regarding the grain size and nonmetallic inclusion content of the particular substance under examination.

According to one feature of the present invention a system for obtaining desired feature content isolation in optical image analysis comprises, deriving from the optical image a first scanned electrical video signal, isolating the desired feature content of said first video signal from the remainder by signal level discrimination or threshold detection to form a second video signal, comparing the first and second video signal, and adjusting the discrimination level in response to the comparison so as to reduce substantially to a minimum any differences between the first and second video signals in respect of the boundaries of the desired feature content.

According to another feature of the present invention a system for obtaining desired feature content isolation of an optical image comprises optical to electrical signal converter means for producing a first scanned electrical video signal corresponding to the image, discriminator means responsive to said first video signal for producing a second video signal and means for comparing said first and second video signals, the discrimination level of the discriminator being adjustable in response to such comparison so as to reduce substantially to a minimum any differences between the first and second video signals in respect of the boundaries of the desired feature content.

Conveniently the two video signals may be applied to a conventional picture display monitor so that the two images appear superimposed the one on the other. The images may then be compared visually and the discrimination level adjusted so as to reduce substantially to a minimum any differences between the first and second video signals in respect of the boundaries of the desired feature content.

Alternatively the two video signals may be sequentially applied to a conventional picture display monitor so that first one and the other image are caused to appear in rapid succession. The images may then be compared visually and the discrimination level adjusted as hereinbefore described.

As a further alternative the two video signals may be applied to a picture display monitor cooperating with a switching means so that the image produced by the display monitor comprises a plurality of parallel bands which alternatively contain the image content of one or the other of the two video signals.

In addition one or both of the video signals may be differentiated and phase inverted when necessary to provide unidirectional pulses so that only the feature boundary or outline signals remain in one or both of the video signals.

The two images may be compared in various ways, and according to one particular feature of this invention, electronic apparatus is provided for this purpose.

Consequently according to a preferred feature of the invention, a system for obtaining desired feature content isolation in optical image analysis comprises an optical to electrical signal convertor for producing a first scanned electrical video signal of an image, a discriminator responsive to said first video signal for producing a second video signal, first pulse shaping means responsive to said first video signal for producing a first standardized signal and second pulse shaping means responsive to said second video signal for producing a second standardized signal, signal inverting means responsive to said second standardized signal for inverting the phase of the second standardized signal relative to said first standardized signal, signal compounding means responsive to said first standardized signal and to the phase inverted second standardized signal for comparing the two signals and detecting any difference therebetween, in respect of the boundaries of the desired feature content, and display means for indicating the presence and magnitude of a detected difference, the discriminator level of the discriminator means being adjustable in response to a detected difference whereby the difference substantially to a minimum.

According to another preferred feature of the invention the pulse shaping means are preceded by analogue differentiating means responsive to said first and second video signals, whereby pulses are obtained which correspond to points on the boundaries of the desired feature content of the original image, After being standardized the one set of pulses constitutes the first standardized signal and the other set of pulses, the second standardized signal.

Alternatively according to a further preferred feature of the invention the pulse shaping means and the analogue differentiating means are replaced by an amplitude and band width limiting means responsive to the second video signal, for producing a band width limited video signal, and quasi-differentiating means are provided the one responsive to said first video signal and the other responsive to the band width limited video signal, the differential signals produced thereby constituting the first and second standardized signals, the amplitude and band width limiting level being adjustable so that the amplitude and band width of the band width limited video signal can be made substantially the same as that of the first video signal.

Furthermore the compounding and comparing means may comprise switching means and amplifier means tuned to the switching frequency of the switching means, whereby the two signals may be sequentially presented to the amplifier, any difference between the two signals applied to the switching means appearing as an amplitude modulated fixed frequency AC signal, which may subsequently be amplified by the tuned amplifier.

Although the difference may be indicated visually and the discrimination level adjusted manually, it is possible to provide automatic discrimination level adjusting means operated by a servo system responsive to the output from the detector means, whereby the discrimination level may be adjusted so as to reduce substantially to a minimum any difference in the signals applied to the compounding means in respect of the boundaries of the feature content of the image under analysis.

In a further embodiment of the invention two video signals are applied to two monitors and an optical-reflecting system comprising a rotating mirror or two half-silvered mirrors is provided so as to present the images from the two picture monitors either sequentially or in a superimposed manner on to a suitable screen.

Figure 5:
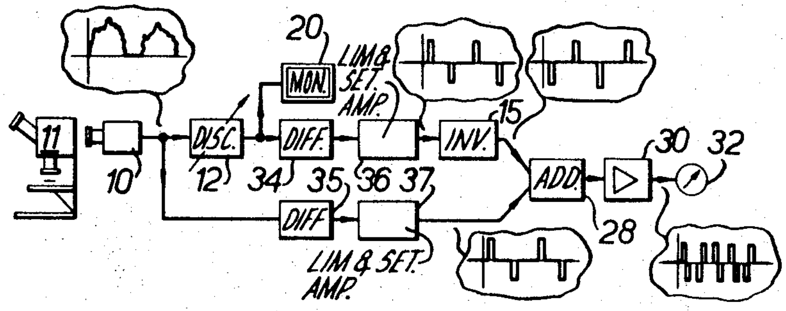
Figure 6:
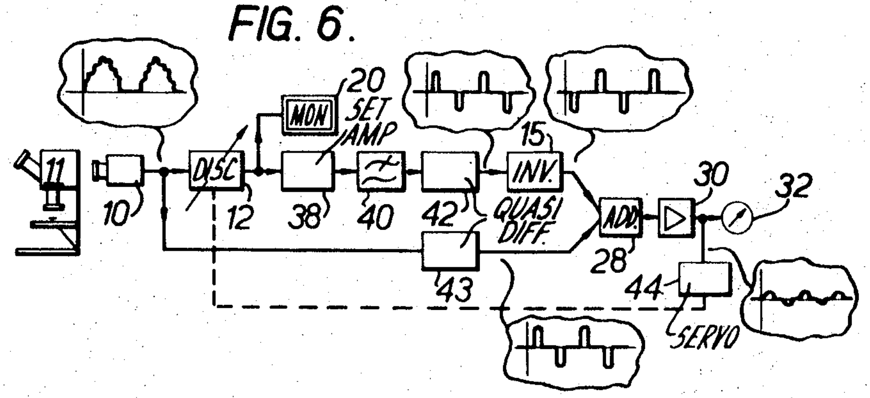
Figure 7A:
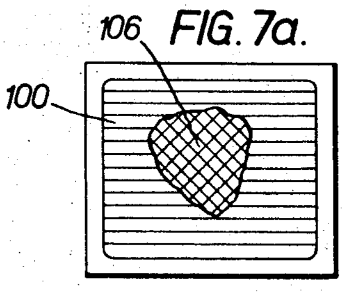
Figure 7B:
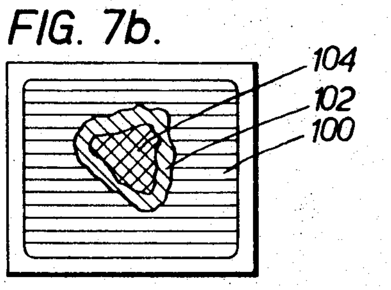

The invention will be described further by way of example with reference to the accompanying drawings, in which:

FIGS. 1 to 3 are schematic diagrams of embodiments of the invention incorporating simultaneous or sequential presentation by a monitor of images corresponding to the first and second video signals, FIGS. 4 to 6 are schematic diagrams of embodiments of the invention incorporating electronic compounding and comparing means and indicating means for indicating any difference between the two signals applied to the compounding and comparing means, FIG. 7*a* represents a picture display monitor in which two images are displayed, superimposed in correct register the one on the other, FIG. 7*b* represents as picture display monitor in which two images are displayed, superimposed the one on the other, in correct register, as the result of a wrong setting of the discrimination level, FIG. 8 is a graphical representation of two video signals X and Y, the one X, corresponding to the signal output from a television camera and the other Y, corresponding to the same signal, after selective discrimination by a discriminator in which the discrimination level is incorrectly set.

Figure 9:
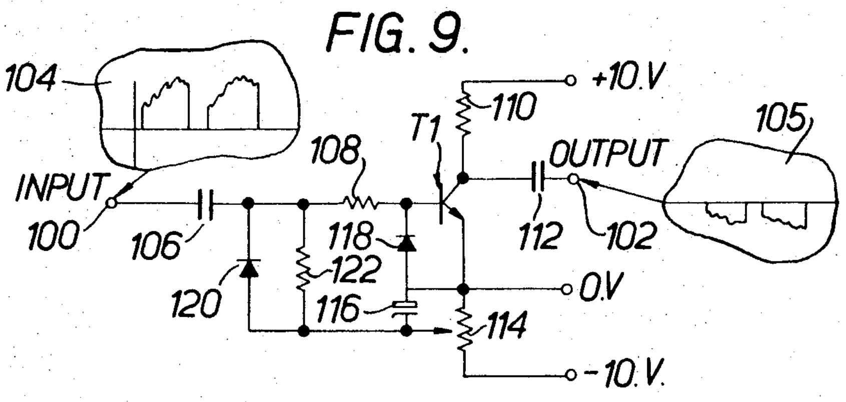
Figure 10:
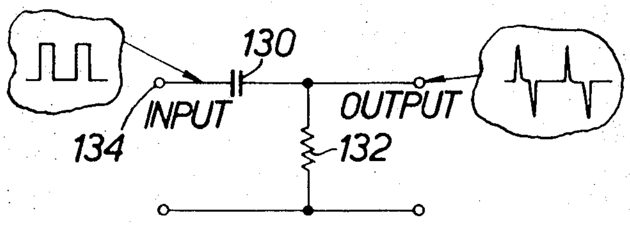

FIG. 9 illustrated one possible arrangement of a discriminator circuit,

FIG. 10 illustrated one possible arrangement of a differentiating circuit, and

Figure 11:
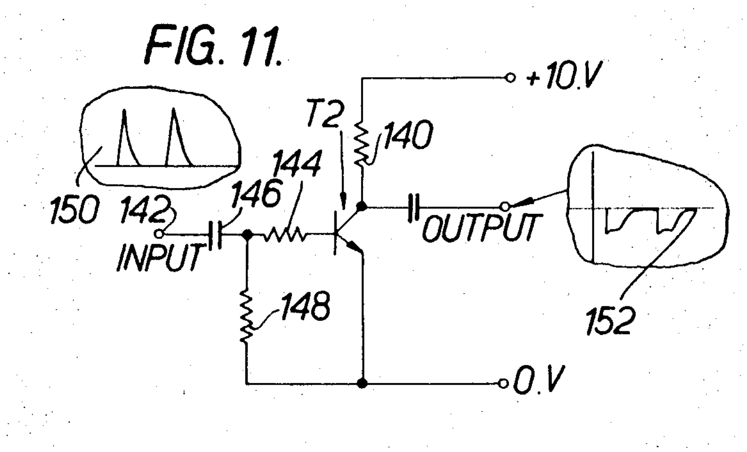

FIG. 11 illustrates one possible arrangement of an amplitude limiting circuit.

Where applicable the same reference numerals have been used throughout to indicate similar apparatus, and approximate waveform of the signals at various junctions of each system have been included.

FIG. 7*b* illustrates diagrammatically two images superimposed the one on the other in incorrect register, the one image 100 extending over the entire area of the screen and containing a single feature 102, and the other comprising only the discriminated image content 104. When discrimination level is set correctly as illustrated in FIG. 7*a*, the boundary of this feature 104 coincides with that of the feature 102, so that the two feature images 102 and 104, appear as a single feature 106.

It may for example be desired to measure the area projection and number of the features of an image, for example the area of feature 102 in image 100, and this can be successfully performed after the discrimination level has been adjusted in the above-described manner.

According to the embodiment illustrated in FIG. 1, an object to be analyzed is placed under a microscope 11, and an optical system is provided whereby the optical image is transmitted to a television camera 10, and the electrical output of this camera forms a video signal which may be analyzed. A discriminator 12 responsive to this video signal supplies a second signal to an amplifier 14, the output of which is supplied to a phase inverting means 15. An amplifier 16 also responsive to the first signal from the television camera supplies an amplified version of this first signal, together with the output of the inverting means 15 to the input of a mixer stage 18, wherein those two signals are combined in such a way that when applied to a conventional picture display monitor 20, two images appear, corresponding to the two signals, and superimposed the one on the other.

In operation, the discrimination level of the discriminator 12 is adjusted until the two images are in correct register as indicted in the simplified example illustrated in FIGS. 7*a* and 7*b*. FIG. 8 represents two video signals X and Y, the first X corresponding to a video signal from the television camera 10, and the other Y, corresponding to this signal after discrimination and inversion. The signals Y, as illustrated in FIG. 8 is indicated incorrectly discriminated, such as illustrated in FIG. 7*b*, and the difference between the two signals, X, Y indicated by sΦ, can be reduced to a minimum, by adjusting the discrimination level of the discriminator, 12.

In the embodiment as illustrated in FIG. 2 the mixer stage 18 is replaced by a switching stage 22 whereby the two signals are sequentially applied to the monitor 20, so that the images appear the one after the other in succession, and the two images may be registered as before described by adjustment of the discriminator 12.

Alternatively the switching stage 22 may be adapted to switch the signals so that the image produced by the display monitor 20 comprises a plurality of parallel bands which alternately contain the image content of one or the other of the two video signals, and the two signals may be correctly registered as before described by adjustment of the discrimination level of the discriminator 12.

In the embodiment illustrated in FIG. 3 the video signal from the discriminator 12 is differentiated by a differentiating stage 24. The resulting signal comprises a series of pulses which correspond to the slope of the leading and trailing edges of the pulses derived from the discriminator 12. After amplification by an amplifier 14, the differentiated signals are selectively inverted by an inverting stage 17 so that the pulses applied to the adding circuit 18 are unidirectional. This unidirectional pulse train is then combined in the adding circuit 18 with an amplified version of the original video signal before discrimination in the same manner as hereinbefore described.

Although an invertor stage has been included in the embodiments illustrated in FIGS. 1 and 2 it is not essential to include this stage, and it may be omitted, in which case the two images displayed on the monitor will appear in similar phase.

The embodiments illustrated in FIGS. 1 to 3 refer to systems wherein the discrimination level is adjustable in response to a visual indication of the original and discriminated images. However it is not necessary to display the two images in order that the discrimination level may be correctly set, and FIGS. 4 and 5 illustrate embodiments wherein the boundary signals of the feature content in both the original and discriminated signals are compared electronically and any difference therebetween detected, and displayed visually by indication means such as a meter.

In the embodiment illustrated in FIG. 4 a scanned video signal from the television camera 10, is supplied to a discriminator 12 having a variable level of discrimination. The output of this discriminator is then applied to an amplitude determiner 26, and the output of this determiner 26 applied to a phase invertor stage 15.

The video signal from the television camera 10 is also applied directly to a second amplitude determining stage 27, the output of which comprises a first electrical signal, and this, together with the output signal from the invertor stage 15, which comprises a second signal, is applied to an adding stage 28, in which the two signals are combined to form an output signal the magnitude of which is proportional to any difference therebetween, and after being amplified by an amplifier 30, this output signal is applied to a meter 32.

A high meter reading will therefore correspond to a large difference, and a low or zero reading to little of no difference between the two signals applied to the adding stage.

In operation the discrimination level of the discriminator 12 is adjusted so that the meter reading is reduced to a minimum.

The image which corresponds to the video output of the discriminator 12 and which is displayed on the picture display monitor 20, may then be analyzed.

In the embodiment illustrated in FIG. 5 the television camera 10 supplies a video signal to a discriminator 12, having a variable level of discrimination and the output of this discriminator 12 is differentiated by a differentiating stage 34. The height and width of the pulses obtained from the differentiating stage 34 are set by a limiter stage 36 and the output pulses from the limiter stage 36 are phase inverted by a phase inverter stage 15, to form a second electrical (video) signal. The video signal from the television camera 10 is also applied directly to a second differentiating stage 35 and the differentiated pulses limited by a limiter stage 37 which is identical to the limiter stage 36. The output from the limiter 37 forms a first electrical (video) signal, which is combined with the second electrical signal, in an adding stage 28, and after being amplified by an amplifier 30 the output from the adding stage 28 is applied to a meter 32 which is sensitive to alternating current. The discrimination level of the discriminator 12 is then adjusted until the meter reading is reduced to a minimum, when the image displayed on the monitor 20 may be analyzed as hereinbefore described.

The embodiment illustrated in FIG. 6 comprises a system whereby the adjustment of the discrimination level of the discriminator 12 is effected by means of a servo mechanism 44, responsive to the output of the amplifier 30.

In addition this particular embodiment illustrates an alternative system for obtaining the two video signals, wherein the output of a discriminator 12 is both amplitude and band width limited by limiter and filter stages 38 and 40, differentiated by a quasi-differentiating stage 42, and then phase inverted by an invertor stage 15. The video signal output from the television camera 10 is also applied directly to a second quasi-differentiating stage 43, and the output of this stage 43 combined with the output from the phase invertor stage 15, by means of the adding stage 28.

As before, the output of this adding stage is then amplified and may be indicated visually by means of the meter 32. This output signal may also be applied to a servomechanism 44, which cooperates with the adjustable means within the discriminator 12, to adjust the discrimination level to give minimum output from the adding stage 28.

When this condition is obtained the image displayed on the picture display monitor 20, contains only the desired feature content of the original video signal, as obtained from the television camera 10, and this image may then be analyzed in the manner previously described.

Although a servosystem has only been shown in conjunction with the embodiment illustrated in FIG. 6, it will be evident to anyone skilled in the art that it is possible to include such a servosystem in any of the embodiments shown in FIGS. 4 to 6.

Furthermore it will be readily apparent to anyone skilled in the art that many alternative circuit arrangements may be used to perform the discrimination, differentiation and amplitude limiting of the video signals, and the circuits illustrated in FIGS. 9, 10 and 11 are consequently only intended to illustrate by way of example, three preferred arrangements.

FIG. 9 illustrates a discriminator circuit for supplying at its output terminal 102 an amplitude discriminated version of an input signal 104 which is applied to its input terminal 100. The input signal 104 is applied to the base of a transistor T1 through a capacitor 106 and a register 108, connected in series, while the discriminated output signal 105 appears across the collector load register 110, which is connected between the collector of the transistor T1 and a source of positive potential of +10 volts. The output signal 105 is applied to the output terminal 102 through a capacitor 112.

The emitter of the transistor T1 is connected directly to a point of zero potential (relative to said source of positive potential) and a potentiometer 114 is connected between the emitter and a source of negative potential of −10 volts (relative to the point of zero potential). A capacitor 116 which is preferably an electrolytic capacitor of relatively large capacitance is connected between the variable tapping of the potentiometer 114 and the emitter of the transistor T1 and a diode 118 is connected between the emitter and base of the transistor. A second diode 120 is connected between the junction between the capacitor 106 and the resistor 108 and the variable tapping of the potentiometer 114 a resistor 122 being connected in parallel with this second diode 120.

By varying the position of the tapping of the potentiometer 114 the base current of the T1 may be varied and the base bias correspondingly varied. If the reference level potential of the video input signal is zero volts and the base is maintained substantially at a potential of zero volts, the transistor T1 will conduct during the whole of each video signal pulse, whereas if the base is maintained at a negative potential of −volts, and the reference level potential of the input signal remains the same, the transistor T1 will only conduct the time interval when the amplitude of each positive going video signal pulse exceeds +V volts. In this way the discrimination level of the discriminator may be varied by varying the position of the tapping of the potentiometer 114.

FIG. 10 illustrates a differentiating circuit which comprises a capacitor 130 and a resistor 132. By arranging that the reactance of the capacitor 130 is very much greater than the resistance of the resistor 123 at the frequency of the video input signal applied to the input terminal 134, the voltage which appears across the resistor 132 will comprise a series of voltage pulses corresponding to the leading and trailing edges of the video signal pulses, the amplitude of each voltage pulse being substantially proportional to the slope of the corresponding leading or trailing pulse edge. Consequently the waveform of the signal appearing across the resistor 132 can be said to correspond substantially to the first differential of the waveform of the video signal applied to the input terminal 134.

FIG. 11 illustrated an Amplitude Limiter circuit which comprises a transistor T2, the emitter of which is connected to a point of zero potential and the collector of which is connected through a resistive load 140 to a source of positive potential of +10 volts. The base of the transistor T2 is connected to an input terminal 142 through a resistor 144 and a capacitor 146, connected in series, and the base current for the transistor T2 is determined and regulated by a base bias resistor 148 connected between the junction of the series connected capacitor 148 and resistor 144 and the point of zero potential. By arranging that the transistor T2 is bottomed by a positive potential on the base, which is substantially less than the positive potential corresponding to the peak amplitude of the input signal pulses 150 applied to the input terminal 142, the signal which appears across the collector load resistor 140 will consist of amplified input pulses, which are cut off and do not extend beyond a given constant amplitude level. In this way substantially triangular input pulses 150 may be converted into trapezoidal output pulses 152, having a constant amplitude which is determined by the bias potential of the base of the transistor.

I claim:

1. A system obtaining separation of specific parts of a complete picture from the remainder of the picture with any difference between the boundaries of the selected specific parts on the one hand and the specific parts in the complete picture on the other hand, reduced to a minimum comprising in combination optical to electrical signal converter means for producing a scanned electrical video signal corresponding to the complete picture and containing signal content both of the specific parts and the remainder of the picture, discriminator means capable of handling video signals and being responsive to the video signal and adjustable to remove signal content of the remainder of the picture and provide an output signal containing only signal corresponding to the specific parts of the complete picture, electronic means for providing a comparison in exact time coincidence between the video signal and the output signal from the discriminator means, and means for adjusting the discrimination level of said discriminator means in direct response to the result of the comparison whereby any differences between the boundaries of the specific parts of the picture in the discriminator output signal and the boundaries of the specific parts in the video signal may be reduced to a minimum.

2. A system for obtaining separation of specific parts of a complete picture from the remainder of the picture with any difference between the boundaries of the selected specific parts on the one hand and specific parts in the complete picture on the other hand, reduced to a minimum comprising in combination optical to electrical signal converter means for producing a scanned electrical video signal corresponding to the complete picture and containing signal content both of the specific parts and the remainder of the picture, discriminator means capable of handling video signals and being responsive to the video signal and adjustable to remove signal content of the remainder of the picture and provide an output signal containing only signal corresponding to the specific parts of the complete picture, differentiating means responsive to the output signal from the discriminator means, signal inverter means for selectively inverting the differentiated signal to form a unidirectional signal whose amplitude variation at a boundary of a selected specific part is opposite to the amplitude variation of the video signal across the boundary, picture display monitor means responsive to the video signal and the output from the signal invertor means, connector means for applying the video signal and the unidirectional signal in exact time coincidence to the monitor means, and means for adjusting the discrimination level of said discriminator means whereby any differences between the displayed boundaries of the specific parts of the picture in the discriminator output signal and the boundaries of the specific parts in the video signal may be reduced to a minimum.

3. A system for obtaining separation of specific parts of a complete picture from the remainder of the picture with any difference between the boundaries of the selected specific parts on the one hand and the specific parts in the complete picture on the other hand, reduced to a minimum comprising in combination optical to electrical signal converter means for producing a scanned electrical video signal corresponding to the complete picture and containing signal content both of the specific parts and the remainder of the picture, discriminator means capable of handling video signals and being responsive to the video signal and adjustable to remove signal content of the remainder of the picture and provide an output signal containing only signal corresponding to the specific parts of the complete picture, picture display monitor means, circuit means responsive to the video signal and the discriminator output signal for applying said two signals in exact time coincidence to the picture display monitor means for visual comparison, and means for adjusting the discrimination level of said discriminator means in direct response to the result of the comparison whereby any difference between the boundaries of the specific parts of the picture in the discriminator output signal and the boundaries of the specific parts in the video signal may be reduced to a minimum.

4. A system according to claim 3 in which the circuit means includes signal inverting means for inverting the phase of one signal relative to the other of said signals and means for simultaneously applying the inverted signal and said other of said signals to the monitor means.

5. A system according to claim 3 in which the circuit means includes signal inverting means for inverting the phase of one signal relative to the other of said signals and gating means for applying the inverted signal and the other signal in rapid succession to the monitor means whereby the two images corresponding to said inverted signal and other signal are displayed on the monitor means in rapid succession.

6. A system according to claim 3 in which the circuit means includes differentiating means responsive to the output signal from the discriminator means, signal invertor means for selectively inverting the differentiated signal to generate unidirectional signals defining the boundaries of the selected specific parts whose amplitude change is opposite to that of the video signal amplitude change caused by the specific parts and connector means for applying the video signal and the unidirectional signal to the monitor means.

7. A system for obtaining desired feature content isolation in analysis of an optical image comprising, in combination, optical to electrical signal converter means for producing first scanned electrical video signal corresponding to the image, discriminator means responsive to the first video signal for isolating the desired feature content of the first video signal to produce a second video signal, picture display monitor means responsive to the second video signal for displaying the isolated feature content, signal comparing means, circuit means responsive to said first and second video signals for applying the two signals to the signal comparing means, said signal comparing means serving to compare the two signals to detect any difference therebetween in respect of the signal content corresponding to the boundaries of the desired feature content to produce an output signal in response to a detected difference, meter means responsive to the output signal for indicating the presence and magnitude of a detected difference, and means for adjusting the discrimination level of the discriminator means whereby the discrimination level may be adjusted to reduce the magnitude of the detected difference between the two signals substantially to a minimum.

8. A system according to claim 7 wherein said circuit means comprises first pulse shaping means including amplitude limiting means responsive to said first video signal for producing a first standardized signal, second pulse shaping means including amplitude limiting means responsive to said second video signal for producing a second standardized signal, signal inverting means responsive to said second standardized signal for inverting the phase of the second standardized signal relative to said first standardized signal, and connector means for applying the two standardized signals to said comparing means.

9. A system according to claim 8 in which the means for adjusting the discrimination level operates in response to a detected difference and includes a servosystem, coupled to the discriminator means and adapted to control the discrimination level thereof in response to the output from said comparing means to reduce said output substantially to a minimum.

10. A system according to claim 7 wherein said circuit means comprises differentiating means responsive to said first and second video signal for producing first and second differentiated signals which correspond to the boundaries of the desired feature content within said first and second video signals respectively, first pulse shaping means including amplitude limiting means responsive to the first differentiated signal and second pulse shaping means including amplitude limiting means responsive to the second differentiated signal for producing first and second standardized differentiated signals respectively, signal inverting means responsive to the second standardized differentiated signal for inverting the phase thereof relative to the first standardized differentiated signal, and connector means for applying said differentiated first video signal and said differentiated limited signal to said comparing means.

11. A system according to claim 10 in which the means for adjusting the discrimination level operates in response to a detected difference includes a servosystem, coupled to the discriminator means and adapted to control the discrimination level thereof in response to the output from said comparing means to reduce said output substantially to a minimum.

12. A system according to claim 7 wherein said circuit means comprises amplitude and band width limiting means responsive to said second video signal for producing a limited signal, differentiating means responsive to said first video signal and to the limited signal to produce differentiated signals corresponding to the boundaries of the desired feature content within said first video signal and said limited signal respectively, signal inverting means responsive to the differentiated limited signal for inverting the phase thereof relative to the differentiated first video signal, and connector means for applying said differentiated first video signal and said differentiated limited signal to said comparing means.

13. A system according to claim 12 in which the means for adjusting the discrimination level operates in response to a detected difference and includes a servosystem, coupled to the discriminator means and adapted to control the discrimination level thereof in response to the output from said comparing means to reduce said output substantially to a minimum.

14. A method of quantitatively measuring a specific part of a specimen having areas of distinctly different optical properties comprising the steps of scanning an image of the specimen and producing an electrical video signal corresponding to the complete image and containing signal content both of the specific part and the remainder of the image, modifying the video signal with a discriminator which is adjustable to remove signal content of the remainder of the image and provide an output signal containing only signal corresponding to the specific part of the complete picture, providing a visual display on a picture display monitor of the video signal and the output signal from the discriminator in exact time coincidence, comparing the displays corresponding to the video signal and the output signal from the discriminator, adjusting the discrimination level of said discriminator in direct response to the result of the comparison of two signals to minimize any differences between the boundaries of the specific part arising from the two signals, and making measurements on the signal corresponding to the specific part of the complete picture.

15. A method of quantitatively measuring a specific part of a specimen having areas of distinctly different optical properties comprising the steps of scanning an image of the specimen and producing an electrical video signal corresponding to the complete image and containing signal content both of the specific part and the remainder of the image, modifying the video signal with a discriminator which is adjustable to remove signal content of the remainder of the image and provide an output signal containing only signal corresponding to the specific part of the complete picture, electronically comparing the video signal in exact time coincidence with the output signal from the discriminator, adjusting the discrimination level of said discriminator in direct response to the result of the comparison of the two signals to minimize any differences between the signal content of the two signals corresponding to the boundary of the specific part, and making measurements on the signal corresponding to the specific part of the complete picture.

* * * * *